United States Patent

Watanabe et al.

[11] Patent Number: 5,993,086
[45] Date of Patent: Nov. 30, 1999

[54] CHARACTER PRINTING APPARATUS HAVING JUDGING MEANS

[75] Inventors: Kenji Watanabe; Tomoyuki Shimmura; Takanobu Kameda; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[21] Appl. No.: 08/982,992

[22] Filed: Dec. 2, 1997

[30] Foreign Application Priority Data

Dec. 9, 1996 [JP] Japan ................................. 8-328160

[51] Int. Cl.⁶ ..................................................... B41J 5/30
[52] U.S. Cl. ............................... 400/61; 400/65; 395/117
[58] Field of Search ................... 400/586, 615.2, 400/61, 62, 65, 70, 76, 103; 395/117, 135

[56] References Cited

U.S. PATENT DOCUMENTS

| | | | |
|---|---|---|---|
| 5,179,649 | 1/1993 | Masuzaki et al. | 395/117 |
| 5,198,907 | 3/1993 | Walker et al. | 395/117 |
| 5,432,890 | 7/1995 | Watanabe | 395/117 |
| 5,685,002 | 11/1997 | Sano | 395/779 |
| 5,805,781 | 9/1998 | McIntyre et al. | 395/117 |

FOREIGN PATENT DOCUMENTS

| | | |
|---|---|---|
| 60251427 | 12/1985 | Japan . |
| 61156193 | 7/1986 | Japan . |
| 62211691 | 9/1987 | Japan . |
| 6419388 | 1/1989 | Japan . |
| 3129572 | 6/1991 | Japan . |
| 3296094 | 12/1991 | Japan . |
| 475095 | 3/1992 | Japan . |
| 5307582 | 11/1993 | Japan . |
| 667641 | 3/1994 | Japan . |

*Primary Examiner*—John Hilten
*Attorney, Agent, or Firm*—Lorusso & Loud

[57] ABSTRACT

The character printing apparatus according to the present invention, in which an input character string is printed on a print medium, includes: eligible-subject-component-character displaying means for displaying an eligible subject component character; subject-component-character selecting means for selecting a desired subject component character out of the eligible subject component characters; display control means for storing the desired subject component character, and causing a display portion to display a control symbol representing that the desired subject component character is inputted and an input position for an object component character in such a manner that the input position for an object component character is located immediately after the control symbol; judging means for judging, when a character to be combined with the subject component character is inputted, whether or not the input character is a character allowed to be combined with the subject component character; composing means for preparing a composite symbol by causing, when it is judged that the input character is a character allowed to be combined with the subject component character, the character thus judged to be displayed at the input position for an object component character as an object component character, and developing both a dot pattern of the subject component character stored in the input buffer and a dot pattern of the object component character in the same font developing area; and composite-symbol printing means for printing the composite symbol thus prepared.

10 Claims, 6 Drawing Sheets

CHARACTER PRINTING APPARATUS HAVING JUDGING MEANS

BACKGROUND OF THE INVENTION

1. Field of the Invention

The present invention relates to a character printing apparatus in which input characters or symbols are printed on a tape or the like. The present invention is preferably applied to a character printing apparatus having a function of printing visual symbols, such as pictographs and the like.

2. Description of the Related Art

A tape printing apparatus, which is one of character printing apparatuses, is designed to facilitate preparation of a label originated by the user which is to be attached on a spine cover of a file or the like.

A conventional tape printing apparatus has a key which is provided on an operation panel and adapted to input characters so that a desired character string can be previously inputted by operating the key.

Also, the conventional tape printing apparatus has a tape feeding mechanism by which a tape can be fed and discharged through a tape discharging outlet.

Further, the conventional tape printing apparatus has a printing mechanism, including a thermal head, and a tape cutting mechanism provided in this order on the path for allowing the tape to be fed.

In the tape printing apparatus, when a print instruction key is operated, control means controls the tape feeding mechanism to feed the tape at a predetermined speed, and controls the tape printing mechanism to print the previously inputted character string on the tape thus fed.

Also, when printing of the character string is completed, the control means further controls the tape feeding mechanism to vacantly feed the tape (i.e., to feed the tape without performing printing on the tape) until a portion of the tape on which printing is completed is entirely positioned outside the tape printing apparatus, then causes the feeding of the tape to be stopped.

After the feeding of the tape is stopped, the tape portion on which the character string is printed is cut off by the tape cutting mechanism which is driven by the user.

Thus, a label originated by the user having thereon a desired character string can be obtained.

Meanwhile, in the tape printing apparatus, since the print medium on which printing is performed is a label, visual symbols, such as pictographs, are frequently used as characters or symbols to be printed, compared with the other character information processors. As such visual symbols, composite symbols each obtained by combining a character or symbol with another character or symbol are often used. It should be noted that hereinafter a character or symbol serving as one component of the composite symbol will be often referred to as "subject component character" while a character or symbol serving as the other component of the composite character will be often referred to as "object component character".

In many conventional tape printing apparatuses having a function of preparing a composite symbol, the composite symbol once prepared cannot be altered with respect to each of the subject and object component characters. Specifically, in some conventional apparatuses, the composite character is displayed in the form of a finished composite symbol, i.e., in the form of one indivisible unitary character incorporating both of the subject and object component characters, and accordingly the subject and object component characters cannot be altered independently. In other conventional apparatuses, the subject and object component characters are displayed separately, but they are not allowed to be altered independently. Thus, in many conventional apparatuses, the subject and object component characters cannot be altered independently. Consequently, in conventional apparatuses, the following problem arises. Specifically, if the user deletes the object component character with an intention to alter only the object component character, the subject component character is also deleted at the same time, that is, the object component character cannot be altered solely. Eventually, the subject and object component characters must be inputted again from the beginning.

Further, in the conventional apparatuses of the type in which the subject and object component characters are displayed separately, the following problem occurs. Specifically, assuming that the desired composite symbol is a symbol having a circle incorporating a numeric character therein, such as "④", since the symbols "◯" and "4" are merely displayed sequentially, the user cannot judge whether the input symbol "◯" serves as a subject component character or only as an ordinary character.

SUMMARY OF THE INVENTION

The present invention is accomplished in view of the above-described problems.

It is an objet of the present invention to provide a tape printing apparatus in which preparation and alteration of a composite symbol can be easily performed compared with the conventional ones.

To achieve the object, the present invention provides a character printing apparatus in which an input character string is printed on a print medium, the character printing apparatus including: (1) input means through which characters or symbols and various instructions are inputted; (2) eligible-subject-component-character displaying means for displaying, when an instruction of inputting a subject component character is inputted through the input means, an eligible subject component character; (3) subject-component-character selecting means for selecting a desired subject component character out of the eligible subject component characters displayed by the eligible-subject-component character displaying means; (4) display control means for storing the desired subject component character thus selected into an input buffer, and causing a display portion to display a control symbol representing that the desired subject component character is inputted and an input position for an object component character in such a manner that the input position for an object component character is located immediately after the control symbol; (5) judging means for judging, when a character to be combined with the subject component character is inputted through the input means, whether or not the input character is a character allowed to be combined with the subject component character; (6) composing means for preparing a composite symbol by causing, when it is judged by the judging means that the input character is a character allowed to be combined with the subject component character, the character thus judged to be displayed at the input position for an object component character as an object component character, and developing both a dot pattern of the subject component character stored in the input buffer and a dot pattern of the object component character in the same font developing area; and (7) composite-symbol printing means for printing the composite symbol thus prepared.

It is preferred that, the character judged by the judging means to be a character allowed to be combined with the subject component character is displayed at the input position for an object component character along with an indicator indicating the input position for the object component character.

It is preferred that, when an instruction of altering the object component character is inputted through the input means while the object component character is displayed by the composing means, the object component character is altered.

It is preferred that, when an instruction of inputting another subject component character is inputted through the input means while the display portion is displaying the control signal, the desired subject component character stored in the input buffer is replaced by the other subject component character inputted through the input means.

It is preferred that the display control means causes the display portion to display the subject component character in such a manner as to be interposed between the control symbol and the input position for an object component character.

It is preferred that, when an instruction of inputting another subject component character is inputted through the input means while the display portion is displaying the desired subject component character, the desired subject component character thus displayed is replaced by the other subject component character inputted through the input means, and the desired subject component character stored in the input buffer is replaced by the other subject component character inputted through the input means.

It is preferred that, when the composing means causes both the dot pattern of the subject component character and the dot pattern of the object component character to be developed, the composing means reduces the dot pattern of the object component character so that the object component character may be contained within the subject component character.

It is preferred that the object component character has a size equal to that of one full-size character.

It is preferred that the object component character has a size equal to that of one full-size character.

It is preferred that the character judged by the judging means to be a character allowed to be combined with the subject component character is displayed at the input position for an object component character along with an indicator indicating the input position for the object component character.

In the character printing apparatus according to the present invention, through the input means, characters or symbols and various instructions are inputted. The eligible-subject-component-character displaying means displays, when an instruction of inputting a subject component character is inputted through the input means, an eligible subject component character. The subject-component-character selecting means selects a desired subject component character out of the eligible subject component characters displayed by the eligible-subject-component character displaying means. The display control means stores the desired subject component character thus selected into an input buffer, and causes a display portion to display a control symbol representing that the desired subject component character is inputted and an input position for an object component character in such a manner that the input position for an object component character is located immediately after the control symbol. The judging means judges, when a character to be combined with the subject component character is inputted through the input means, whether or not the input character is a character allowed to be combined with the subject component character. The composing means prepares a composite symbol by causing, when it is judged by the judging means that the input character is a character allowed to be combined with the subject component character, the character thus judged to be displayed at the input position for an object component character as an object component character, and developing both a dot pattern of the subject component character stored in the input buffer and a dot pattern of the object component character in the same font developing area. The composite-symbol printing means prints the composite symbol thus prepared.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which.

DETAILED DESCRIPTION OF THE INVENTION

Hereinafter, a tape printing apparatus as an embodiment of the character printing apparatus according to the present invention will be described with reference to the attached drawings.

(A) Overall Constitution of Electrical Members in the Embodiment

First, the overall constitution of electrical members in a tape printing apparatus as an embodiment of the character information processor according to the present invention will be described with reference to FIG. 2, which is a function block diagram showing the function of each element.

Figure 2:
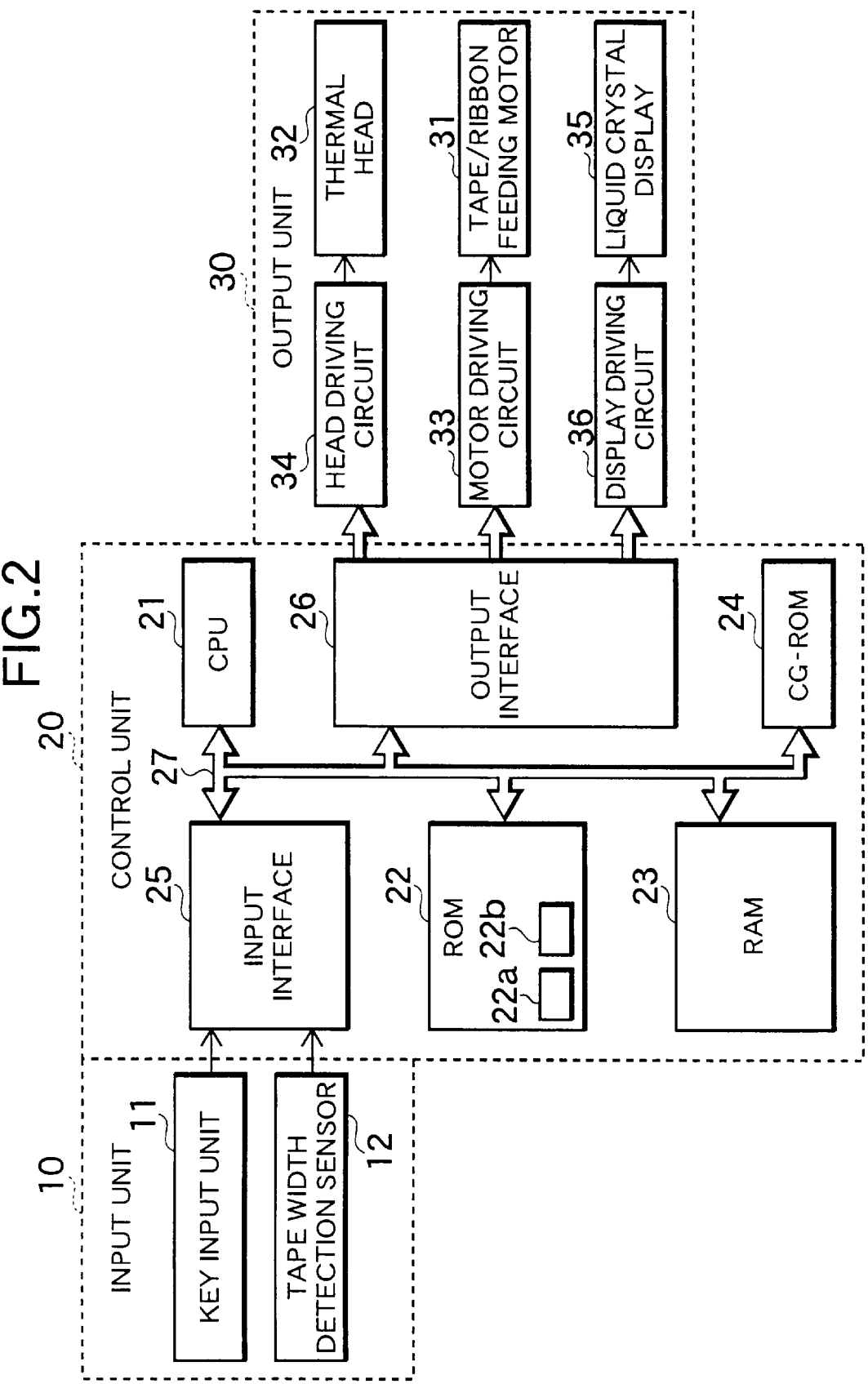
FIG. 2 is a function block diagram showing the overall configuration of the embodiment.

As shown in FIG. 2, similarly to the other character printing apparatuses, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, and a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge (which accommodates the tape and an ink ribbon) and representing the width of the tape accommodated in the tape cartridge.

The output unit 30 includes members serving as a print mechanism and members serving as a display mechanism. The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The thermal head 32 have a performance of simultaneously printing, for example, 96 dots at its maximum. The tape/ribbon feeding motor 31 is driven by a motor driving circuit 33, and the thermal head 32 is driven by the head driving circuit 34, both driven under the control of the control unit 20.

Cutting of the tape portion on which printing is completed is performed by a cutter (not shown) which is driven by a motor (not shown). Cutting of such a tape portion may be performed by a cutter which is driven by a force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an input character string, various attribute information, and so on. On the display 35, there are displayed a plurality of indicators which are adapted to be lighted, flashing or lighted off to indicate states of the attributes designated by the characters printed at the portions lying on the apparatus body and surrounding the display 35.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is backed up even while the electric power is turned off.

The processing programs and the fixed data stored in the ROM 22, and the fixed data stored in the RAM 23 will be detailed later. The ROM 22 also stores a program for composite symbol input 22a, and a group of subject component characters 22b which is specially provided for preparing composite symbols (hereinafter the group of subject component characters 22b will be often referred to as "subject component character group 22b"). Further, when the program 22a is executed, a part of the RAM 23 is used as a working area.

The CG-ROM 24 is adapted to store font information of letters provided in the tape printing apparatus, and to output, when code data for specifying a letter are supplied, font information corresponding thereto. The font information stored in the CG-ROM 24 may be either of outline font and bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown).

(B) Input Processing Related to Composite Symbol

The tape printing apparatus according to this embodiment has a subject-component-character group 22b containing subject component characters each of which is combined with another full-size character (object component character) to obtain one symbol (composite symbol). In the following descriptions, processing of introducing such a composite symbol and processing of developing the composite symbol thus introduced performed during the print processing will be described with reference to the attached drawings. It should be noted that in this embodiment the composite symbol on the liquid crystal display 35 as a combination of a control symbol and the subsequently displayed input position for an object component character. Here, the control symbol represents that a subject component character having a size equal to that of one full-size character is inputted. The object component character is, as described above, a character or symbol which is allowed to be combined with the subject component character.

Figure 1:
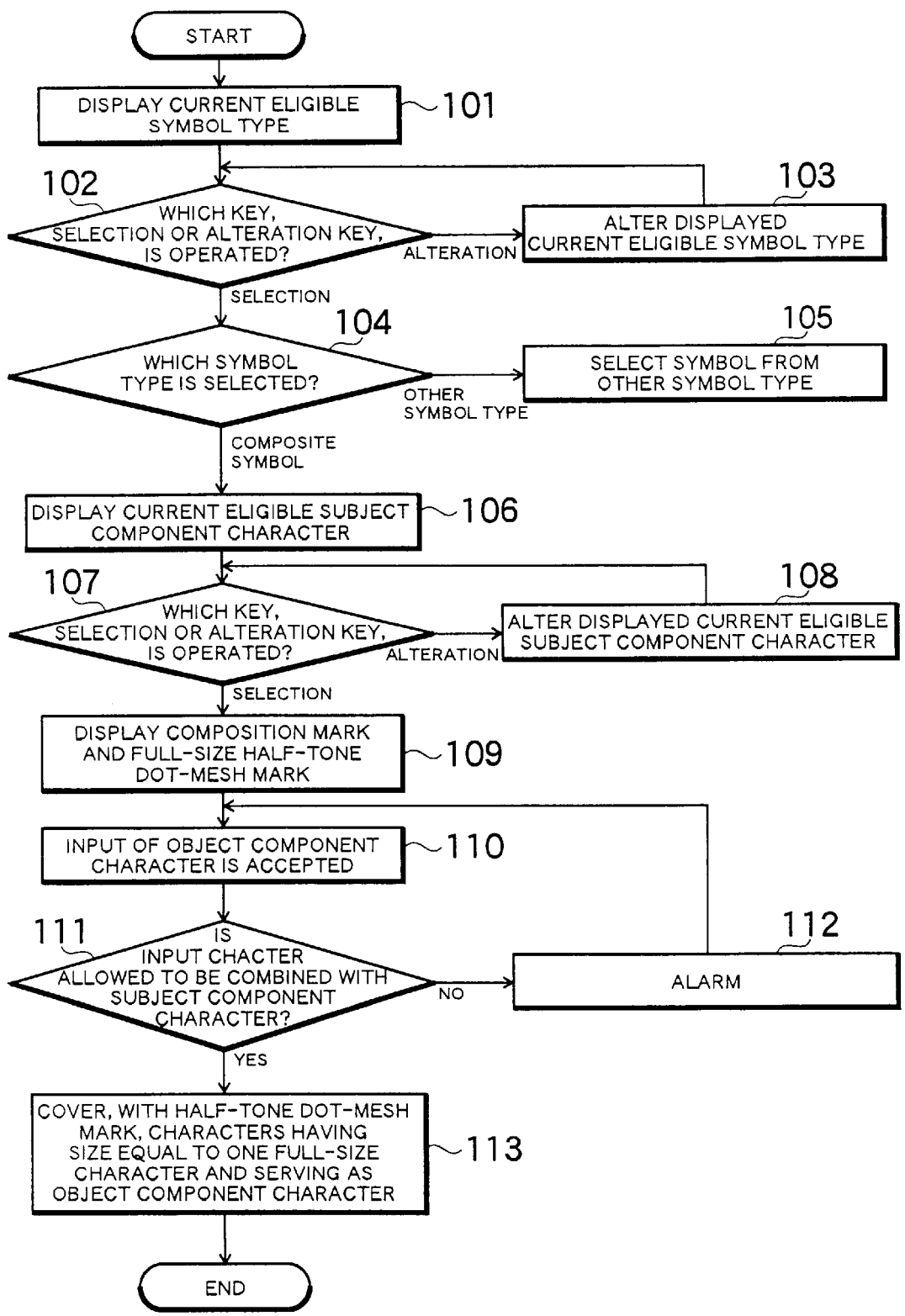
FIG. 1 is a flowchart showing processing of inputting a composite symbol according to the embodiment.

FIG. 1 is a flowchart showing the processing of inputting a composite symbol, and associated processing. In this embodiment, the subject-component-character group 22b is stored in the ROM 22 as one of the symbol types provided in the apparatus. When a key for designating symbol input (hereinafter often referred to as "symbol key") is operated, the CPU 21 starts the processing program 22a shown in FIG. 1 which is stored in the ROM 22. It should be noted that, for example, a key specially provided for symbol input can be employed as the symbol key.

Figure 4A:
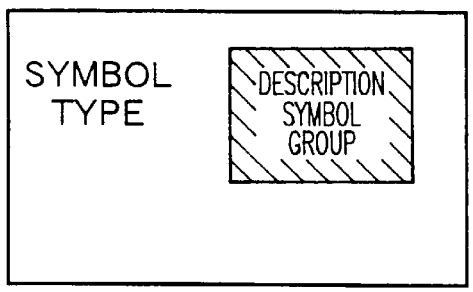
FIGS. 4A, 4B, 4C, 4D, 4E, 4F and 4G are explanatory views showing an example of how the display screen changes when a composite symbol is inputted.

First, the CPU 21 causes at step 101 the liquid crystal display 35 to display a current eligible symbol type. FIG. 4A shows an example of how the current eligible symbol type is displayed.

Here, the apparatus has various kinds of symbol types, including a VTR cassette symbol group containing symbols designed for VTR cassettes, a unit symbol group containing unit symbols, a description symbol group containing description symbols, a living creature symbol group containing symbols for living creatures, a vehicle symbol group containing symbols for vehicles, and a numerical formula group containing symbols for numerical formulas. In this embodiment, as described above, the subject-component-character group is provided as one of the symbol types.

The symbol type which is preferentially displayed as the current eligible symbol type is a symbol type which is most frequently used among the symbol types provided in the apparatus, or a symbol type which is selected as an eligible one immediately before the symbol input is designated. In the case of an apparatus in which a plurality of symbol types are displayed at one time, the current eligible symbol type is displayed, for example, in a flashing manner with the cursor positioned thereon.

Thereafter, the CPU 21 judges at step 102 which key, the selection key or an alteration key (for example, a cursor movement key serves as the alteration key), is operated.

When it is judged as step 102 that the alteration key is operated, the CPU 21 causes at step 103 the current eligible symbol type (the symbol type displayed in a flashing manner) to be altered, and returns to the above-mentioned step 102.

When it is judged at step 102 that the selection key is operated, the CPU 21 proceeds from step 102 to step 104 to judge which symbol type is selected.

When it is judged at step 104 that the selected symbol type is a symbol type other than the subject-component-character group, the CPU 21 proceeds to step 105 to perform the processing routine in which a symbol is selected out of the symbols belonging to the symbol type thus selected.

Figure 4B:
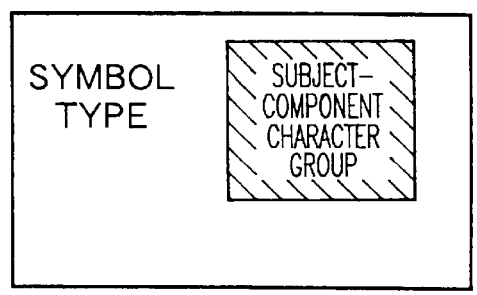
Figure 4C:
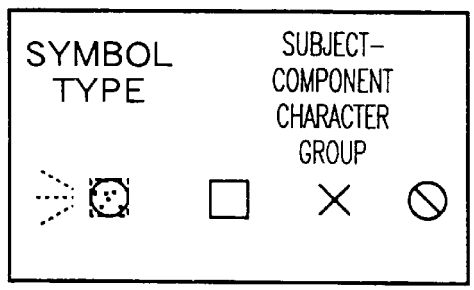

By contrast, when it is judged at step 104 that the selected symbol type is the subject component character group, as shown in FIG. 4B, the CPU 21 causes at step 106 the liquid crystal display 35 to display a plurality of subject component characters belonging to the subject component character group as shown in FIG. 4C. Here, the current eligible subject component character is displayed in a flashing manner. In FIG. 4, the symbol "◯" is the current eligible subject component character. It should be noted that in the case of an apparatus in which only one character is displayed, only one subject component character is displayed as an eligible one.

While the current eligible subject component character is being displayed, the CPU 21 judges at step 107 which key, the selection key or an alteration key (for example, a cursor movement key serves as the alteration key), is operated.

Figure 4D:
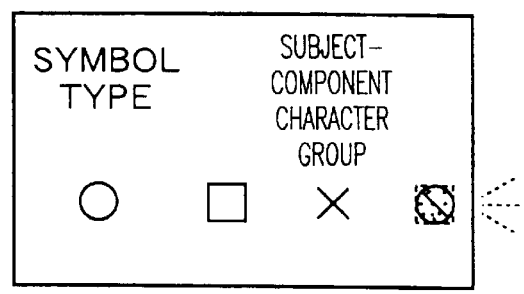

When it is judged at step 107 that the alteration key is operated, the CPU 21 causes at step 108 the current eligible subject component character (the subject component character displayed in a flashing manner) to be altered, and returns to the above-mentioned step 107. FIG. 4D shows the state taken at a time after the current eligible symbol type is altered.

Figure 4E:
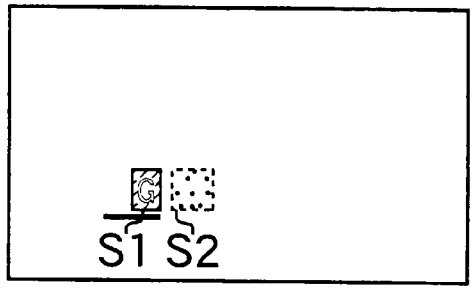

When it is judged at step 107 that the selection key is operated, the CPU 21 proceeds from step 107 to step 109 in which the CPU 21 determines the current eligible subject component character as a determined subject component character and stores the determined subject component character (in the case of FIG. 4D, a "prohibition mark", i.e., one symbol composed of figures "◯" and "\") in the buffer area for an input character string formed in the RAM 23 at a position located after the character code that has been stored as the final one. The CPU 21 also takes action on the display buffer area to restore the Character input screen taken at the time when the symbol key is operated. Also, the CPU 21 causes a composition mark S1 representing that the subject component character is inputted to be displayed at the character input position indicated by the cursor at the time when the symbol key is operated. In the case of FIG. 4E, the half-size character "G" displayed in an inverse manner serves as the composition mark S1. It should be noted that the composition mark S1 is followed by a full-size half-tone dot-mesh mark S2 representing that the character covered with the mark S2 is an object component character.

Thus, the composition mark S1 and the full-size half-tone dot-mesh mark S2 are inseparably related to each other.

After performing the steps associated with the display of the subject component character, the CPU 21 proceeds to step 110 in which input of an object component character is accepted. Thereafter, the CPU 21 proceeds to step 111 in which the CPU 21 judges whether or not the character or symbol inputted by the user is suitable for an object component character, that is, whether or not the input character is a character or symbol allowed to be combined with the subject component character. Here, character input, code input, symbol input, two-digit numeral input, input of negative characters are allowed. When a key operation or the like associated with unallowable input, the CPU 21 proceeds to step 112 to notify the user, by means of alarm sound or rejection of the input, that the key operation or the like is associated with unallowable input, and then returns to step 110.

Figure 4F:
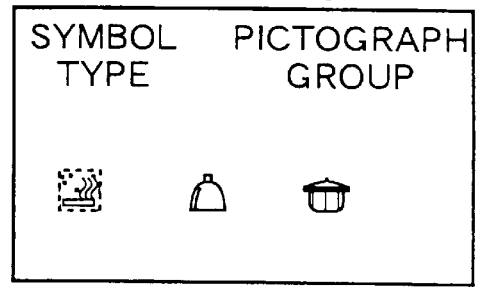

At step 110, when, for example, a symbol key is operated, the CPU 21 causes the liquid crystal display 35 to display a current eligible symbol type, and thereafter the symbol type to be inputted can be selected, as in the above-mentioned step 101. FIG. 4F shows the state in which a pictograph group is selected as the symbol type to be inputted. The pictograph group is a symbol type suitable for an object component character and therefore the pictograph is allowed to be inputted. Accordingly, an arbitrary one of the symbols belonging to the pictograph group can be selected and inputted by operating the selection key.

When a desired symbol is selected out of the symbols belonging to the pictograph group and the selected symbol is inputted in this way, the CPU 21 proceeds from step 111 to step 113 in which the CPU 21 determine the selection of the character thus inputted, and then stores the symbol thus determined in the buffer area for the input character formed in the RAM 23 at the place located after the character code that has been stored as the final one. Also, the CPU 21 takes action on the display buffer area so as to restore the character input screen taken at the time when the symbol key is operated at step 110, and places the character thus selected at the character input position indicated by the cursor at the time when the symbol key is operated.

Figure 4G:
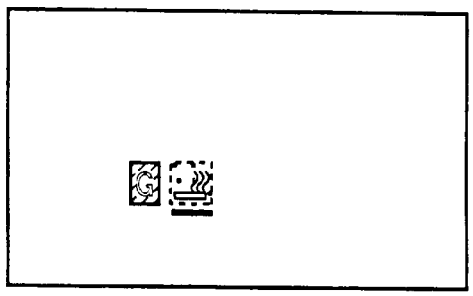
Figure 7B:
FIGS. 7A, 7B, 7C and 7D are explanatory views showing examples of printed composite symbols.
Figure 7D:
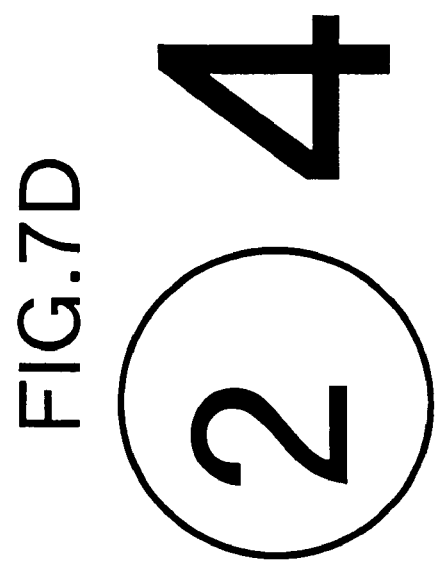
Figure 7A:
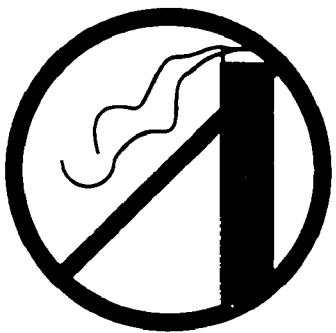

Thereafter, the CPU 21 causes the dot pattern as shown in FIG. 4G to be displayed, thus terminating a sequence of the processings. In the case of FIG. 4G, a smoking symbol belonging to the pictograph group is selected as the object component character, and the half-tone dot-mesh mark represents that the smoking symbol will be combined with the subject component character which is already obtained by the above-mentioned way. An example of printed composite symbol obtained through this input processing is shown in FIG. 7A.

In the above description, explanation is made as to the case where a smoking mark belonging to the pictograph group is selected as the object component character. Next, description will be made as to the case where an ordinary character or a half-size numeric character, which is a typical example of the object component character, is selected as the object component character. In the following descriptions as to the cases of an ordinary character and a half-size numeric character, only the features different from those of the smoking mark belonging to the pictograph group will be described.

Figure 5A:
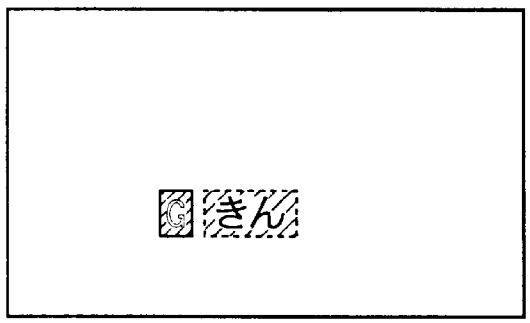
FIGS. 5A and 5B are explanatory views showing another example of how the display screen changes when a composite symbol is inputted.
Figure 5B:
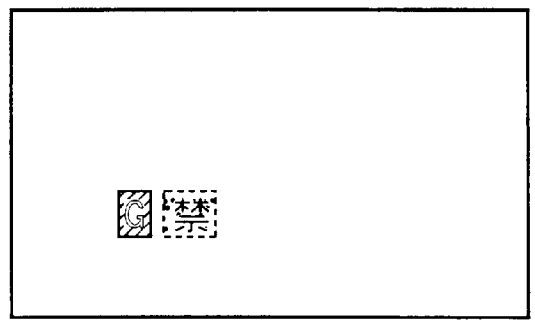

In the case where an ordinary character is selected as the object component character to be combined with a subject component character, the half-tone dot-mesh mark representing that the input position for the object component character is erased momentarily, and instead the input character is displayed in an inverse manner, as shown in FIG. 5A. Thereafter, when the conversion key is operated, the display will be as shown in FIG. 5B. In the case of FIG. 5B, the character obtained after the conversion is "禁", which is expressed as one full-size character, and therefore the displayed character "禁" is covered with the half-tone dot-mesh mark. An example of printed composite symbol obtained through this input process is shown in FIG. 7B. It should be noted that, if two or more characters are obtained after conversion, only the first character is regarded as the object component character to be combined with the subject component character. That is, the half-tone dot-meshing mark is placed only on the first character.

Figure 6A:
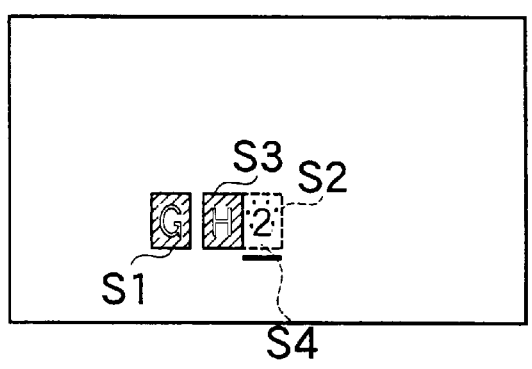
FIGS. 6A, 6B and 6C are explanatory views showing still another example of how the display screen changes when a composite symbol is inputted.
Figure 6B:
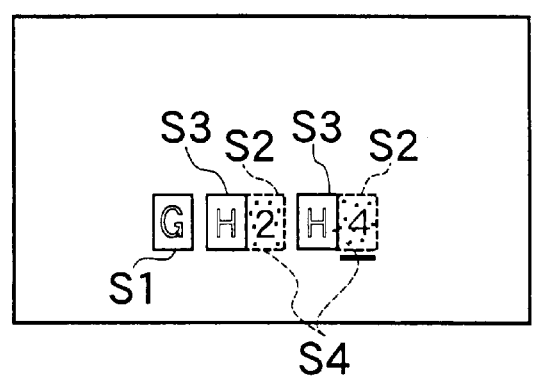
Figure 6C:
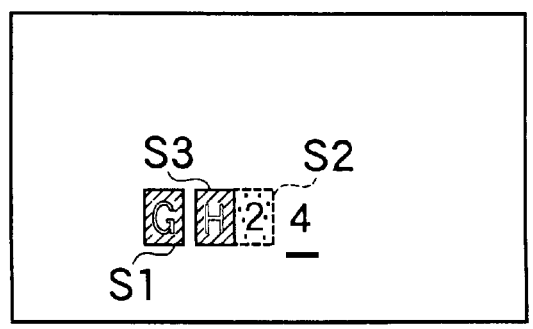

In the case where a half-size numeric character is selected as an object component character to be combined with a subject component character, processing of obtaining a composite character will be as shown in FIGS. 6A to 6C. Specifically, since a half-size numeric character group is one of the symbol types provided in the apparatus, a desired half-size numeric character is obtained by first designating a half-size numeric character group out of the symbol types provided in the apparatus, and then selecting the desired numeric character out of the half-size numeric characters belonging to the half-size numeric character group. For example, if "2" is obtained through the above procedure as the desired half-size numeric character, the resulting display is as shown in FIG. 6A. As is known from FIG. 6A, the half-size numeric character is expressed by a combination of a dot pattern S3 representing that the displayed character is a half-size character and a dot pattern S4 representing the numeric character itself, and the combination of the dot patterns S3 and S4 has a size equal to that of one full-size character. It should be noted that this way of expressing a half-size numeric character is the same as in the case where a half-size numeric character is inputted solely.

In the case of FIG. 6A, the dot pattern S4 is covered with the half-tone dot-mesh mark S2 because the object component character is, not to mention, "2" which is denoted by the dot pattern S4.

It should be noted that, so long as the total size of the inputted characters is not larger than the size of one full-size character, the inputted characters are treated as the object component character to be combined with the subject component character to be altered into a composite symbol.

Accordingly, as shown in FIG. 6B, if the subsequently inputted character is a half-size numeric character, it is treated as the object component character, so that the two half-size numeric characters, serving as a two-digit numeral, are covered with the half-tone dot-mesh mark S2.

Figure 7C:
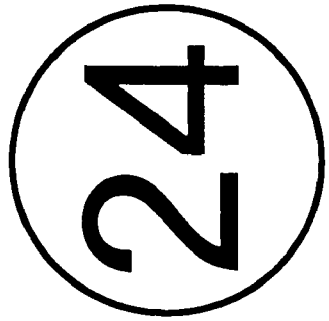

To the contrary, as shown in FIG. 6C, if the subsequently inputted character is a full-size character, only the firstly inputted character "2" is covered with the half-tone dot-mesh mark S2. This implies that the subsequently inputted one full-size character is not treated as the object component character to be combined with the subject component character. FIGS. 7C and 7D show the print examples of the composite symbol corresponding to these cases.

It should be noted that the processing of inputting the composite symbol can be cancelled, for example, by operating a cancel key in the course of operations of selecting a symbol, while explanation as to such cancellation is omitted in the above description.

Further, if the user intends to change the subject component character, his intention is accomplished by newly inputting another subject component character at the input position for a subject component character (the position where the composition mark S1 is displayed on the liquid crystal display 35). In this case, the subject component character already inputted is replaced by the newly inputted subject component character.

If the user intends to change the object component character, his intention is accomplished by deleting the object component character which has been already inputted and newly inputting another object component character at the input position for an object component character (the position where the half-tone dot-mesh mark S2 is displayed on the liquid crystal display 35).

(C) Processing of Developing Composite Symbol

Figure 3:
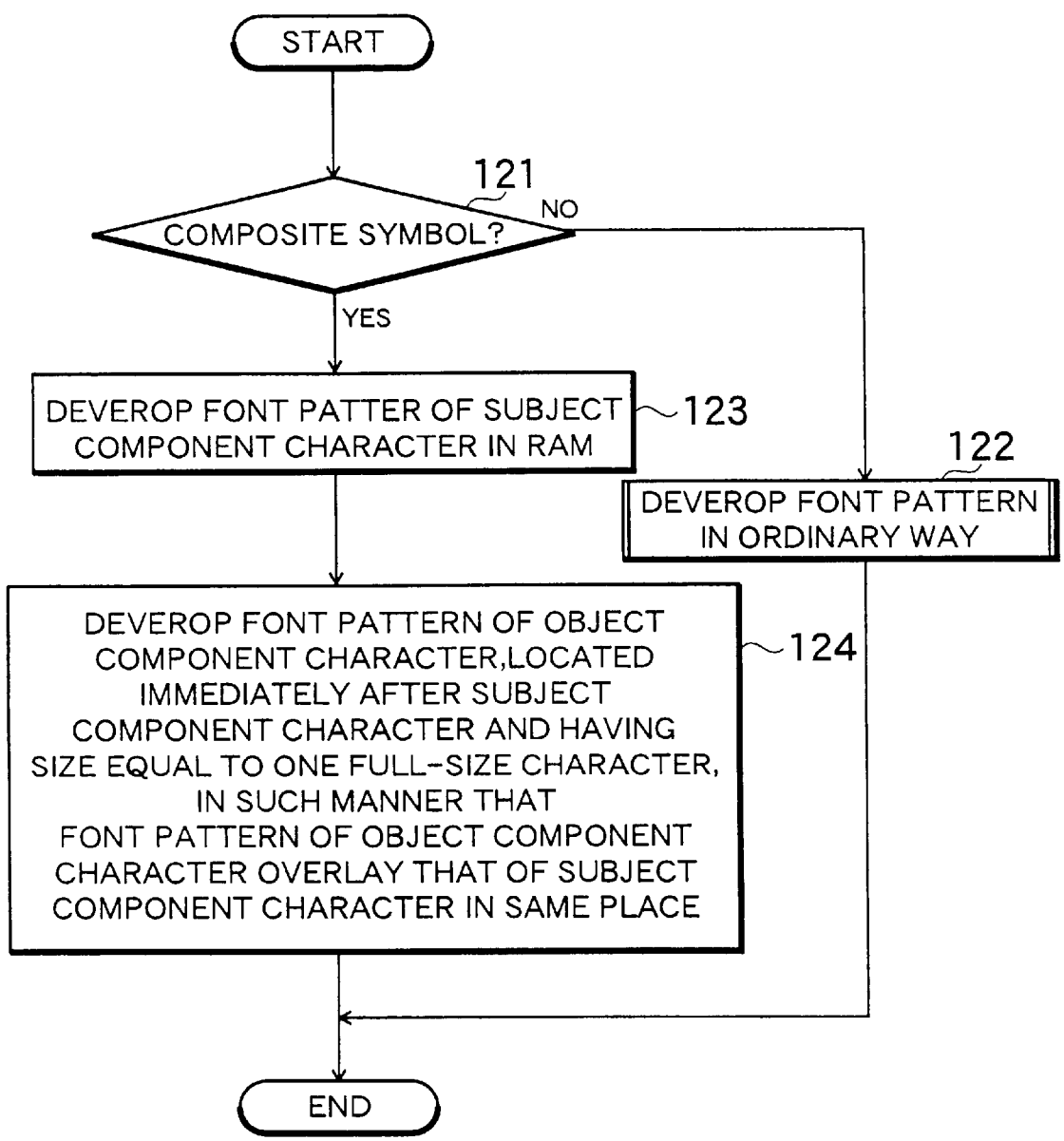
FIG. 3 is a flowchart showing processing of developing a composite symbol at the time when printing processing is performed.

Referring to FIG. 3, explanation will be made as to processing of developing each character (not to mention, including processing of developing composite symbols) performed during the print processing.

Development of characters of a character string is accomplished by repeatedly performing the processing for developing one character shown in FIG. 3. It should be noted that in the case of vertical printing, there are two ways of developing characters. According to one way of them, development is conducted in such a manner that the font (dot pattern) supplied from the CG-ROM 24 is rotated at the time of development. According to the other way, development is conducted in such a manner that the font (dot pattern) supplied from the CG-ROM 24 is stored as it is at the time of development, and the developed font is rotated when it is read out to activate the thermal head. The following explanation will be made assuming that the latter way is employed as the way of developing characters, that is, that the development processing itself is not different between the cases of horizontal and vertical writings.

On entering the processing shown in FIG. 3, the CPU 21 judges at step 121 whether or not the current character to be developed is a composite symbol. When it is judged at step 121 that the current character is not a composite character, the character to be developed is developed in the same way as ordinary ones at step 122. Thus, the development processing with respect to the current character to be developed is completed.

By contrast, when it is judged at step 121 that the current character to be developed is a composite symbol, the CPU 21 reads the font pattern (dot pattern) of a subject component character out of the CG-ROM 24 and develops the font pattern in the font developing area formed on the RAM 23 (step 123). In this case, its character size is determined according to the attribute of the character string to be printed.

Thereafter, the CPU 21 reads at step 124 the font pattern (dot pattern) of the object component character (i.e., the character to be combined with the subject component character), which is located immediately after the subject component character and has a size equal to that of one full-size character, out of the CG-ROM 24 and develops the font pattern in the same font developing area as used in developing the subject component character. Development of the font patterns are conducted in such a manner that the object component character is overlaid on the subject component character. Specifically, the development is conducted in such a manner that the significant dots (i.e., on-dots, which usually form a figure or diagram portion of a character) of the subject component character are not erased by blank dots (i.e., off-dots, which usually form a ground or background portion of a character) of the dot pattern of the object component character when the object component character is overlaid on the subject character.

It should be noted that, if the object component character is a half-size numeric character, the development processing slightly differs according to whether the number of the half-size numeric characters is one or two. Specifically, in the case where only one half-size numeric character is displayed, the half-size numeric character serving as the object component character is positioned at the leftmost position of the subject component character, as shown in FIG. 7D. By contrast, in the case where two half-size numeric characters are developed, the two half-size numeric characters are treated as one full-size character (see FIG. 7C).

By way of the above-mentioned procedure, the sequence of the development processing with respect to the current character to be developed is performed and then completed.

By printing the font information obtained through the above-mentioned development processing on a label, a label on which a composite symbol is printed is obtained, as described above and shown in FIGS. 7A, 7B, 7C and 7D. It should be noted that, as described above, the composite symbol is obtained by combining two characters or symbols each having a size equal to that of one full-size character.

It should be noted that, in the above-described processing, the subject and object component characters are combined as they are, but the way of composing them is not limited thereto. Specifically, if the subject component character is a symbol including a circle, such as "④", the object component character, in principle, must be positioned within the circle, and therefore composing the object component character must be conducted after reducing the size of the object component character during the development of the fonts of the component characters. In this case, the centers of the subject and object component characters must be positioned in such a manner as to overlap the center of the resulting composite symbol.

(D) Advantages of the Embodiment

As described above, according to this embodiment, since the user can alter the subject component character and the object component character independently, the usability of the tape printing apparatus is greatly enhanced compared with conventional ones.

Further, according to this embodiment, the control symbol represents that the displayed character is a subject component character. Owing to this configuration, the user can easily know whether the displayed character is a subject component character or an ordinary character based on whether the control symbol is present or absent. Specifically, assuming that the desired composite symbol is composed of a circle "◯" and a numeric character enclosed by the circle, such as "④", if no control symbol is displayed and the characters "◯" and "4" are merely displayed subsequently, the user cannot clearly distinguish between the case where the input "◯" serves as a subject component character and the case where "◯" serves as an ordinary character. To the contrary, the user can distinguish the two cases from each other by verifying whether the control symbol is present or absent.

(E) Other Embodiments

Although the preferred embodiments of the present invention have been described above, it should be understood that the present invention is not limited thereto and that other modifications will be apparent to those skilled in the art without departing form the spirit of the invention.

(1) In the above-described embodiment, the half-size character "G" displayed in an inverse manner serves as the composition mark S1 representing that a subject component character is inputted. However, the present invention is not limited thereto, and different marks displayed in different manners may be employed as the composition mark S1.

(2) In the above-mentioned embodiment, when a subject component character is inputted, the user can know the fact that the subject component character is inputted but cannot know the contents of the subject component character. This is because the composite mark S1 representing that the subject component character is inputted is displayed on the display screen, but a mark representing the contents of the input is not displayed on the display screen. However, the apparatus may be configured in such a manner that the contents of the subject component character is displayed along with the mark representing that that the subject component character is inputted. For example, the apparatus may be configured in such a manner that the subject component character itself is displayed along with a mark representing that the subject component character is inputted, as in the case where the half-size numeric character is displayed.

(3) In the above-described embodiment, the characters and symbols used for an object component character are limited to specific existing characters and symbols. However, characters and symbols specially prepared for an object component character may be added thereto.

(4) In the above-described embodiment, description is made as to the tape printing apparatus in which characters or symbols are printed on the front surface of the tape whose rear surface includes an adhesive layer, the present invention is not limited thereto.

For example, the present invention can be applied to a character information processor in which input character is transferred to an ink ribbon by means of the thermal transferring method.

Specifically, in a character information processor employing the thermal transferring method, when characters and symbols are transferred to the ink ribbon by means of the thermal transfer printing method, the transferred portion of the ink ribbon turns into transparent. Further, if light beams are irradiated through the ink ribbon while employing the ink ribbon whose part is transparent as a negative film, the characters or symbols formed by the transparent portion of the ink ribbon are transferred to a photosensitive member. Thus, the characters or symbols are printed on the photosensitive member through the transfer processings of the characters or symbols to and from the ink ribbon. This implies that, in the information processor employing the thermal transferring method, such transferring processings are covered by the term "print" set forth in the claims and specifications of the present invention. Further, in the step of transferring characters to the ink ribbon, the function of preparing a composite symbol disclosed in the above-mentioned embodiment can be applied.

Consequently, the present invention can be applied to the character information processor employing the thermal transferring method.

(5) In the above-mentioned embodiment, one subject component character having a size equal to that of one full-size character is combined with one object component character consisting of one character or symbol also having a size equal to that of one full-size character. However, the present invention can be applied to a case where a plurality of subject component characters are combined with each other, the case where a plurality of object characters are combined, and the case where the former two cases are combined.

(6) In the above-mentioned embodiment, the subject component character group containing subject component characters, which are specially prepared for preparing a composite character, is provided. However, the present invention can be applied to the case where such specially prepared characters are not provided.

(7) Advantages of the Invention

As described above, according to the present invention, since there are provided: (1) input means through which characters or symbols and various instructions are inputted; (2) eligible-subject-component character displaying means for displaying, when an instruction of inputting a subject component character is inputted through the input means, an eligible subject component character; (3) subject-component-character selecting means for selecting a desired subject component character out of the eligible subject component characters displayed by the eligible-subject-component character displaying means; (4) display control means for storing the desired subject component character thus selected into an input buffer, and causing a display portion to display a control symbol representing that the desired subject component character is inputted and an input position for an object component character in such a manner that the input position for an object component character is located immediately after the control symbol; (5) judging means for judging, when a character to be combined with the subject component character is inputted through the input means, whether or not the input character is a character allowed to be combined with the subject component character; (6) composing means for preparing a composite symbol by causing, when it is judged by the judging means that the input character is a character allowed to be combined with the subject component character, the character thus judged to be displayed at the input position for an object component character as an object component character, and developing both a dot pattern of the subject component character stored in the input buffer and a dot pattern of the object component character in the same font developing area; and (7) composite-symbol printing means for printing the composite symbol thus prepared. Owing to this configuration, the user can alter the subject and object component characters independently of each other.

Further, since the subject component character is denoted by control symbol or by a combination of a control symbol and a subject component character, the user can easily distinguish between the case where the input character which is identical with a character belonging to the subject component character is inputted as a mere ordinary character or the case where such a input character is inputted as a subject component character.

It should be noted that, since the present invention is not limited to the above-described embodiments and modifications, the present invention is to be determined solely by the appended claims.

What is claimed is:

1. A character printing apparatus in which an input character string is printed on a print medium, said character printing apparatus comprising:

input means through which characters or symbols and various instructions are inputted;

eligible-subject-component-character displaying means for displaying, when an instruction of inputting a subject component character is inputted through said input means, an eligible subject component character;

subject-component-character selecting means for selecting a desired subject component character out of the eligible subject component characters displayed by said eligible-subject-component character displaying means;

display control means for storing the desired subject component character thus selected into an input buffer, and causing a display portion to display a control symbol representing that the desired subject component character is inputted and an input position for an object component character in such a manner that the input position for an object component character is located immediately after the control symbol;

judging means for judging, when a character to be combined with the subject component character is inputted through said input means, whether or not the input character is a character allowed to be combined with the subject component character;

composing means for preparing a composite symbol by causing, when it is judged by said judging means that the input character is a character allowed to be combined with the subject component character, the character thus judged to be displayed at the input position for an object component character as an object component character, and developing both a dot pattern of the subject component character stored in the input buffer and a dot pattern of the object component character in the same font developing area; and composite-symbol printing means for printing the composite symbol thus prepared.

2. The character printing apparatus according to claim 1, wherein the character judged by said judging means to be a character allowed to be combined with the subject component character is displayed at the input position for an object component character along with an indicator indicating the input position for the object component character.

3. The character printing apparatus according to claim 1, wherein, when an instruction of altering the object component character is inputted through said input means while the object component character is displayed by said composing means, the object component character is altered.

4. The character printing apparatus according to claim 1, wherein, when an instruction of inputting another subject component character is inputted through said input means while the display portion is displaying the control signal, the desired subject component character stored in the input buffer is replaced by the other subject component character inputted through said input means.

5. The character printing apparatus according to claim 1, wherein said display control means causes the display portion to display the subject component character in such a manner as to be interposed between the control symbol and the input position for an object component character.

6. The character printing apparatus according to claim 5, wherein, when an instruction of inputting another subject component character is inputted through said input means while the display portion is displaying the desired subject component character, the desired subject component character thus displayed is replaced by the other subject component character inputted through said input means, and the desired subject component character stored in the input buffer is replaced by the other subject component character inputted through said input means.

7. The character printing apparatus according to claim 1, wherein, when said composing means causes both the dot pattern of the subject component character and the dot pattern of the object component character to be developed, said composing means reduces the dot pattern of the object component character so that the object component character may be contained within the subject component character.

8. The character printing apparatus according to claim 7, wherein the object component character has a size equal to that of one full-size character.

9. The character printing apparatus according to claim 1, wherein the object component character has a size equal to that of one full-size character.

10. The character printing apparatus according to claim 9, wherein the character judged by said judging means to be a character allowed to be combined with the subject component character is displayed at the input position for an object component character along with an indicator indicating the input position for the object component character.

\* \* \* \* \*